United States Patent [19]

Van Dyke et al.

[11] Patent Number: 5,085,063

[45] Date of Patent: Feb. 4, 1992

[54] BICYCLE HANDLEBAR LOCK

[75] Inventors: Laroy J. Van Dyke, Audubon, Pa.; Kenneth Cluff, Orem, Utah

[73] Assignee: Innovative Bicycle Products, Inc., Huntingdon Valley, Pa.

[21] Appl. No.: 622,927

[22] Filed: Dec. 6, 1990

[51] Int. Cl.⁵ ............... B62H 5/04; E05B 71/00
[52] U.S. Cl. ............... 70/218; 70/233; 70/386; 70/389; 70/404; 70/408; 280/279; 280/280; 403/374
[58] Field of Search .......... 70/386, 233, 225, 218, 70/222, 389, 188, 189, 491, 404, 408, 236, 224; 280/279, 280; 403/374, 104

[56] References Cited

U.S. PATENT DOCUMENTS

| | | | |
|---|---|---|---|
| 464,392 | 12/1891 | Scheid | 70/188 |
| 653,243 | 7/1900 | Hussey | 403/374 |
| 1,471,553 | 10/1923 | Fell . | |
| 1,623,455 | 4/1927 | Andrew . | |
| 2,139,984 | 12/1938 | Southwell et al. | 70/233 |
| 2,303,241 | 11/1942 | Taman | 70/233 |
| 2,576,773 | 11/1951 | Buxton | 70/233 |
| 3,408,840 | 11/1968 | Hasenbein | 70/404 |
| 3,785,676 | 1/1974 | Klein, Jr. | 70/233 X |
| 4,310,260 | 1/1982 | Katayama | 403/374 X |
| 4,347,757 | 9/1982 | Martin | 403/374 X |
| 4,507,945 | 4/1985 | Hwang | 70/491 |
| 4,901,544 | 2/1990 | Jang | 70/218 |

FOREIGN PATENT DOCUMENTS

| | | |
|---|---|---|
| 460164 | 5/1928 | Fed. Rep. of Germany . |
| 642793 | 5/1928 | France ............... 70/218 |
| 671451 | 12/1929 | France . |
| 691211 | 10/1930 | France . |
| 755302 | 11/1933 | France . |
| 885347 | 9/1943 | France . |
| 2575713 | 7/1986 | France . |
| 106371 | 10/1963 | Netherlands ............ 70/408 |
| WO90/04535 | 5/1990 | PCT Int'l Appl. . |
| 176222 | 3/1922 | United Kingdom . |

*Primary Examiner*—Lloyd A. Gall
*Attorney, Agent, or Firm*—Eckert Seamans Cherin & Mellott

[57] ABSTRACT

Theft of a bicycle is discouraged by a locking mechanism in the front headstem that controllably engages the handlebar-attached headstem with the front fork or disengages the headstem and fork for free relative rotation. A shaft attached to the fork and a sleeve attached to the handlebar clamp are connected at a locking junction which is rotatable as a whole in the front journal of the frame. A key operated cam moves a locking roller radially outwardly of the shaft to engage a receptacle in the sleeve for engagement or allows the roller to retract into an aperture for disengagement. The shaft and sleeve have complementary conical tapers axially positioned by a split conical bushing. A cylinder lock operates the cam via a key having a substantially tubular configuration with a uniquely configured axial end for positioning lock pins against axial spring pressure. The key has a radially protruding guide tab, and fits into an annular key receptacle with two longitudinal slots, one for the guide tab upon insertion of the key, and the other capturing the key via the guide tab in the locking position of the lock. The key has a rounded end cap configured to cover a top of the frame headstock.

16 Claims, 3 Drawing Sheets

BICYCLE HANDLEBAR LOCK

BACKGROUND OF THE INVENTION

1. Field of the Invention

This invention relates to the field of locking devices for discouraging theft of vehicles such as bicycles, and in particular to a key operated device which either fixes the handlebar assembly relative to the front fork of a bicycle, whereupon the bicycle can be operated, or which decouples the handlebar assembly for free rotation relative to the fork, rendering the bicycle inoperable due to lack of steering control.

2. Prior Art

Bicycle locks usually provide a means for locking together necessarily movable parts of the running or steering gear of the bicycle as a means to prevent theft by disabling the bicycle. Therefore, even though the lock does not attach the bicycle to a fixed location a thief cannot simply drive the bicycle away. For example, a conventional bicycle lock provides a shaft, cable or other structure that can be extended through the spokes of a wheel and locked to the frame to prevent rotation of the wheel. This concept can be extended to a device providing means to lock the front fork at an inoperable orientation relative to the frame of the bicycle, for example fixing the steerable wheel (usually the front wheel) perpendicular to the longitudinal axis of the bicycle. The present invention relates to the reverse form of a lock, wherein the connected mode of the lock allows the bicycle to be ridden by operably attaching parts necessary for steering (the handlebars and the steerable wheel). The disconnected mode of the lock disables operation of the bicycle by releasing these parts, making it impossible to steer the bicycle as necessary to get underway. Control of the steerable wheel is crucial to maintaining balance at low speed.

A bicycle lock of this general description is known as disclosed in International Application PCT/AU89/00462—Orbell, filed Oct. 26, 1989. The connection by which the handlebar stem is fixed to the steerable front fork of the bicycle is provided with a rotationally decoupleable fitting, operated using a key. The handlebars become rotatable relative to the fork for disabling steering of the bicycle, and become rotationally fixed relative to the fork for enabling steering. A shaft member attached to the handlebar clamp is journalled at the front of the bicycle frame and attached to the central vertical tube of the fork using a conventional expandable fitting. The handlebar clamp assembly includes a sleeve member that fits on the top end of the shaft member and the sleeve is rotatable relative to the shaft, but for operation of the lock. The lock has radially movable locking members that in the decoupled mode retract into apertures in the shaft member, and in the coupled mode reside partly in the shaft member and partly in the sleeve. A key operated cylinder rotates a cam urging the locking members radially outwardly through the apertures in the shaft to engage in corresponding receptacles for the rollers in the sleeve. The locking members are cylindrical rollers spaced at 120° around the shaft and sleeve. When the cam is rotated back (i.e., when no radially outward pressure is placed on the rollers), any steering force tends to rotate the sleeve relative to the shaft and causes the rollers to retract into the shaft. This frees the handlebar clamp for rotation relative to the fork and makes it impossible to operate the bicycle. The cylinder lock rotates the cam thirty degrees between the locked position (where the rollers are aligned to the receptacles in the sleeve) and the unlocked position (where the rollers are centered between receptacles). The operator inserts the key only when moving between the locked and unlocked modes, and the key is removable from the lock at either extreme.

Although the Orbell device is useful for the basic function of engaging and disengaging the mechanical connection of the handlebar clamp and the fork, difficulties are encountered in realizing the design in a practical embodiment. Axial connection of the lock parts and the handlebar clamp and fork parts is one area of difficulty. The bolt used to operate the expanding fitting that engages the handlebar clamp shaft or headstem to the fork tube must be accessible for attaching the headstem to the fork through the journal fitting at the front or headstock of the bicycle frame. The handlebar sleeve and cylinder lock therefore must be attached over the end of this bolt after the handlebar clamp shaft is mounted on the fork. According to Orbell, the axial attachment of the parts relies on set screws or "grub screws" which are passed radially through the parts, and also axially to bear against abutments, whereby the respective parts are captured on the headstem. These elements do not provide the precision necessary to ensure that the look elements operate smoothly and dependably, particularly over the useful life of the lock. The mechanism should be smoothly free to rotate when the lock is released and should provide minimal play, preferably no play whatsoever, in the connection between the handlebars and the fork when the lock is engaged. If too much play is provided, which can occur when the axial connection of the parts is loose, the handlebars and the steering fork remain relatively movable somewhat when the locking members are in the coupled position. This condition is quite unsettling to the operator of the bicycle and is unsafe. On the other hand if the mounting is too tight (for example due to binding of the lock as a result of excess axial pressure), the lock becomes ineffective because sufficient frictional engagement between the handlebars and the fork exists in the decoupled position that a thief can steer adequately to get the bicycle under way. Once underway, rotational inertia tends to stabilize the front wheel, and frictional engagement of the coupling may be adequate for operation, although not particularly safe.

In order to operate dependably, a mounting for a lock of this type is needed which is very precise with respect to clearances needed for free relative rotation of the coupled parts, particularly providing precision in the axial pressure applied at the lockable coupling. The mounting must also lock positively when engaged, without play in the coupling. This would enable correct control the frictional engagement of the parts and also allow a very positive engagement in the coupled mode of the lock.

A further problem is encountered with respect to use of the key which operates the lock. According to Orbell, a standard key having a flat finger-manipulated tab is employed and the key can be removed from the lock in either the engaged or disengaged position of the lock. There is no means provided to retain the position of the cylinder lock against displacement by vibration or the like produced by operation of the bicycle. Whereas the angular span of the cylinder lock between the engaged and disengaged positions is only thirty degrees, and no means are provided to retain the lock in position when engaged, an operator of the bicycle suddenly may be confronted with a loss of steering control through the mechanical coupling of the handlebars and the fork, while riding.

The operator of a bicycle according to Orbell presumably could leave the key in the lock when riding, to monitor position of the cylinder lock visually, enabling a quick correction should the connection of the handlebars and the fork become loose due to displacement of the locking cam and cylinder lock. The key, however, is a safety hazard in itself, as its finger tab protrudes from the top of the headstem and may injure the rider in the event of a collision. Furthermore, the key can be lost in transit.

According to the present invention, the sleeve and shaft of a locking connection of the type at issue are securely, precisely and durably attached in a manner providing a minimum of access to the headstem. The axial attachment of the respective parts is provided with conically engaging complementary tapers, including a split tapered or conical bushing supported by a fitted spacer. A split tapered bushing normally would render such a coupling sensitive to axial pressure on the parts, resulting in increased frictional engagement of the coupleable parts of the lock. However, the frictional engagement is precisely controlled notwithstanding normal variations in the parts due to manufacturing tolerances, wear and the like. The device is quite secure when engaged yet very free when disengaged. A particular form of tubular key having a protective cap for the headstem operates the lock. The key has a tubular key stem insertable axially into an annular key opening which is modified such that the key stops positively at either of its extremes of movement. The key is spring biased against the lock pins and has a guide tab which retracts into a capturing receptacle when the lock is in the engaged position. The invention provides an improved headstem locking coupling that is inexpensive, durable, safe and precise.

SUMMARY OF THE INVENTION

It is an object of the invention to provide a practical application of a bicycle headstem engagement and disengagement device for anti-theft protection, having a maximum of precision and safety and at a minimum cost and requiring that the key be disposed in the lock, and remain in the lock, at all times when the bicycle is operated.

It is also an object of the invention to reduce the play in a headstem engagement lock, in both the engaged and disengaged positions, without producing undue frictional engagement between the coupled parts.

It is a further object of the invention to improve the safety of a headstem disengaging lock by providing a key arrangement that captures the lock at its engaged position.

It is another object of the invention to provide a captured key for a headstem engagement apparatus that forms an integral protective indicating cover showing the status of the lock without providing a dangerous protrusion and being necessarily carried in the lock during operation of the bicycle.

It is another object of the invention to provide an adjustably tightenable mounting between a sleeve and shaft in a headstem disengaging lock, wherein the axial pressure applied to conically tapered engagements between respective surfaces of the sleeve and shaft can be precisely set.

These and other objects are accomplished by a locking mechanism mountable in the front headstem of a bicycle, that controllably engages the handlebar-attached headstem with the front fork or disengages the headstem and fork for free relative rotation. A shaft attached to the fork and a sleeve attached to the handlebar clamp are connected at a locking junction which is rotatable as a whole in the front journal of the bicycle frame. A key operated cam moves a locking roller radially outwardly of the shaft to engage a receptacle in the sleeve for engagement, enabling steering control, or allows the roller to retract into an aperture for disengagement, causing loss of steering control. The shaft and sleeve have complementary conical tapers axially positioned by a split conical bushing. A cylinder lock operates the cam via a key having a substantially tubular key stem configuration with a axial end slotted uniquely for each lock, for positioning lock pins against axial spring pressure. The key stem has a radially protruding guide tab, and fits into an annular key receptacle with two longitudinal slots, one for the guide tab upon insertion of the key, and the other capturing the key via the guide tab to fix the lock in the engaged position. The key has a rounded end cap configured to cover a top of the frame headstock.

BRIEF DESCRIPTION OF THE DRAWINGS

There are shown in the drawings the embodiments of the invention as presently preferred. It should be understood that the invention is capable of embodiment in other specific forms in accordance with the invention as disclosed and claimed. In the drawings:

DETAILED DESCRIPTION OF THE PREFERRED EMBODIMENTS

With reference to FIGS. 1-4, a mechanism is provided according to the invention for discouraging theft of a bicycle by controllably enabling or disabling steering control. This is accomplished using a headstem unit which is axially fixed but with respect to rotation either couples the handlebars or similar steering mechanism rigidly to the steerable wheel of the bicycle, or decouples them to allow free relative rotation. Inasmuch as a thief requires at least initial control of the orientation of the steerable wheel of the bicycle relative to the frame in order to achieve a balanced motion (at least until rotational inertia stabilizes the steerable wheel), the apparatus of the invention dependably prevents the thief from using the inherent mobility of the bicycle for removing it from the scene. Although a sophisticated thief may carry the bicycle away or load it into a vehicle, most bicycle thefts are impulse actions which the invention defeats by making the bicycle impossible to ride away, or even to wheel away under steering control using the handlebars.

Figure 4:
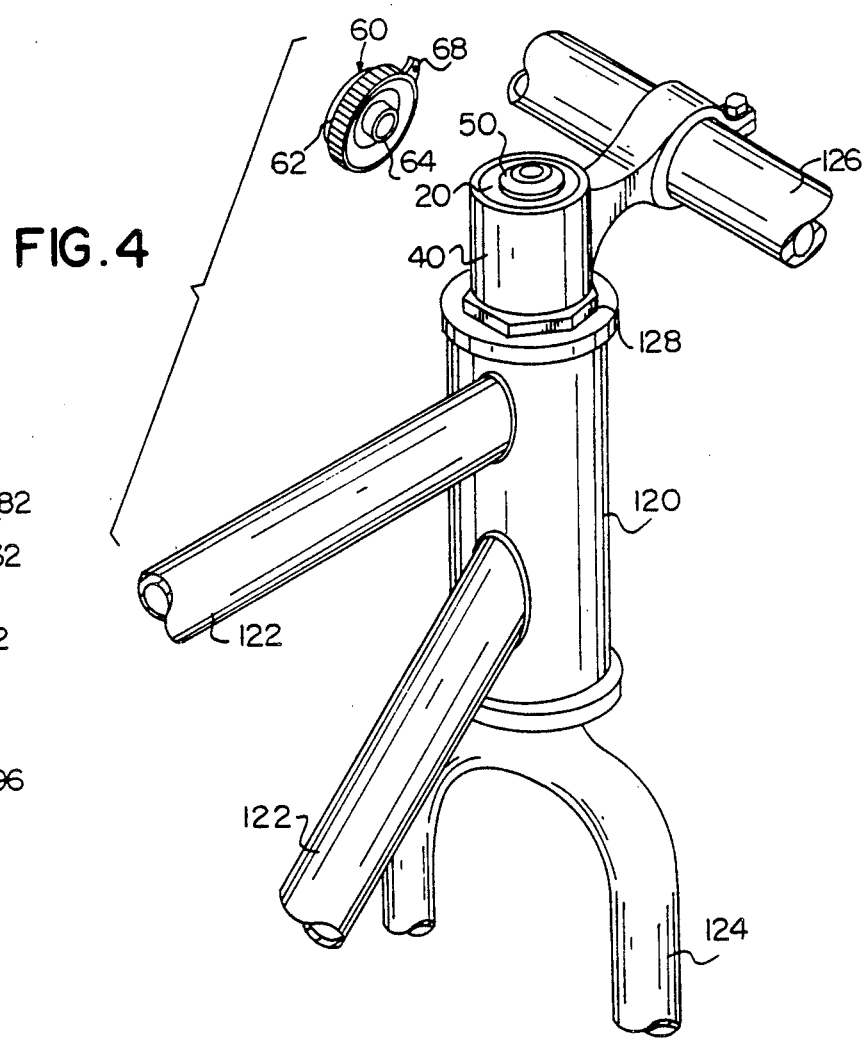
FIG. 4 is a partial perspective view of a bicycle including the locking mechanism of the invention, the key being shown removed from the lock.

The locking mechanism of the invention is applicable to various forms of bicycles which require balanced motion and use a steerable wheel. As shown in FIG. 4, the bicycle may be steerable via a front fork 124 which carries a wheel (not shown) and is rotatable about an axis defined by a frame headstock 120. The user rotationally positions the fork 124 by manipulating a handlebar 126 having laterally protruding grips, fixed relative to the fork 124 by a shaft passing through the headstock. The fork forms an inverted "Y" shape, with the central part of the fork defined by a tube extending upwardly through the headstock. The fork and handlebar assembly are axially fixed but freely rotatable in the headstock 120, supported on bearings or the like. A nut 128 engages the top of the fork assembly for axially attaching the fork in place, exerting minimal axial pressure such that the fork is freely oriented as desired for steering.

The embodiment of the invention shown in FIG. 4 is arranged such that the shaft extending into the fork is at the lowest possible position. This makes the shaft inaccessible to be grasped by a tool such as clamping pliers or the like. However, it may be desirable to allow the shaft to remain exposed above the journal fitting such that the handlebars are positioned comfortably higher.

The locking assembly of the invention is preferably integral with the headstem or upper end of the fork-handlebar assembly, and attaches to the fork in the same manner as known handlebar mountings. A first member or shaft member 20 (see FIGS. 1 and 2) has means for rigid attachment relative to the fork 124. Preferably, the first or shaft member 20 has a bolt 22 disposed coaxially therein, the lower end of the bolt being threaded into an expanding fitting defined by a nut 24 which can be drawn axially upwardly using the bolt 22. The interaction of facing inclined surfaces 26 of the shaft member 20 and expansion fitting nut 24 causes the nut 24 to become displaced laterally as bolt 22 is tightened relative to the internal flange 28 against which the head of bolt 22 rests. This wedges the bottom end of shaft member 20 tightly in the central tube of the fork, locking shaft member 20 axially and rotationally relative the fork 124.

A second member or sleeve member 40 has means for rigid attachment relative to the handlebars 126, and in particular relative to a clamp 44 at the end of a handlebar stub 42. The clamp 44 attaches rigidly to the handlebars via nut 46 and bolt 48, which compress the clamp 44 on a central boss of the handlebars, typically having anti-rotation knurling. The clamp 44 is attached at a distance from the axis of the sleeve member 40 defined by the handlebar stub 42 such that the handlebar arrangement rotates about the axis defined by the shaft member and the sleeve member, namely around the steering axis of the bicycle. The sleeve 40, stub 42, clamp 44 and compression bolt receptacle can be welded or cast as a whole.

The first and second members (i.e., shaft member 20 and sleeve member 40) are rotatably coupleable and decoupleable at a locking junction. One of the shaft and sleeve members has at least one aperture carrying a locking body and the other of the first and second members has a receptacle for receiving the locking body. Preferably, two locking bodies are provided in the form of tumbler rollers 70, the receptacle 74 receiving each roller in the coupled (engaged) position having a radially sloping edge contour complementary to the tumbler rollers. The aperture 72 and the receptacle 74 for each of the tumbler rollers are correspondingly positioned and dimensioned such that the tumbler roller 70 or similar locking body resides wholly within the aperture 72 when the aperture 72 and receptacle 74 are misaligned, rotationally decoupling the handlebars from the fork. When the aperture 72 and the receptacle 74 are aligned, the tumbler roller can be displaced partway into the receptacle 74 to reside partly in the aperture 72, and partly in the receptacle 74, both dimensioned closely to the tumbler roller, thus rotationally coupling the handlebars and the fork.

Figure 3B:
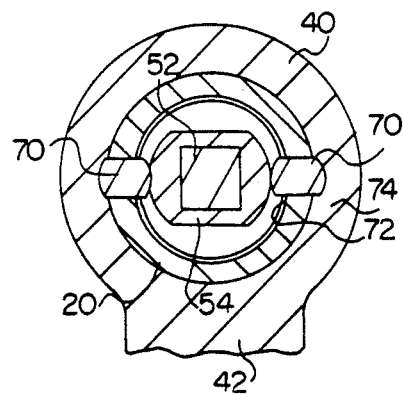
FIG. 3b is a section view of an alternative embodiment corresponding to FIG. 3a, but wherein the locking bodies are rollers having flattened sides which bear on parallel walls of the apertures.
Figure 3A:
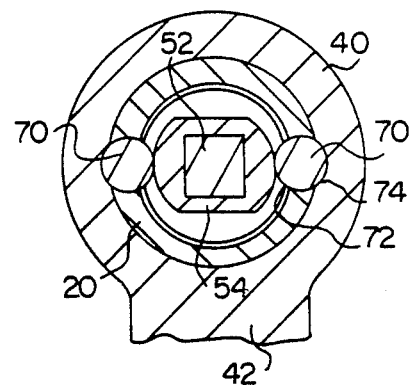
FIG. 3a is a section view thereof, taken along lines 3—3 in FIG. 2.

In FIG. 3a, the rollers 70 are shown as round in cross section. The apertures 72 define a radial passage with walls spaced at the diameter of the rollers, allowing the rollers to be displaced radially inwardly. Whereas the rollers are round they contact the walls of the apertures along a limited area of contact. It is also possible as shown in FIG. 3b to provide locking bodies with substantially flattened sides spaced to fit in the apertures. According to both FIGS. 3a and 3b the receptacles 74 are defined by partially cylindrical slots in the sleeve member 40 and the apertures have substantially parallel walls. According to FIG. 3b, however, the locking bodies have flattened sides resting against the walls of the apertures, thereby increasing the area of contact.

A lock mechanism including a cylinder lock 50, which is operated using a special form of key 60, is disposed at the locking junction of the shaft and sleeve members 20, 40. The cylinder lock has a rotatable shaft 52 engaging in a cam 54 which bears against the tumbler rollers 70. The cam 54 is rotatable using the key 60 and cylinder lock 50, between a first position wherein shaft 20 and sleeve 40 are engaged as shown for example in FIG. 3, and a second position wherein the two are disengaged and freely rotatable relative to one another. The cam 54 in the first position urges each of the tumbler rollers 70 or similar locking bodies from a respective aperture 72 toward the receptacle 74, thus fixing the shaft member 20 and sleeve member 40 against relative rotation, whereupon the bicycle can be operated. The cam 54 in the second position is aligned to face its flattened side surfaces toward the tumbler rollers 70, leaving the rollers 70 free to retract into apertures 72. The rounded shape of the tumbler rollers 70 interacts with the sloping edge contour of the receptacles, such that any rotational force applied to the handlebars 126 relative to the fork 124, including minimal force applied in steering movements, pushes the tumbler rollers back into the apertures 72. The bicycle cannot be operated The first member 20 (the shaft member) and the second member 40 (the sleeve member) define an axially fixed, concentrically arranged cylinder and tube. A precise attachment across the locking junction is provided that remains rotationally free when the tumbler rollers 70 are disengaged (i.e., the attachment has minimal frictional engagement between the shaft 20 and sleeve 40). Conversely, the attachment remains rotationally rigidly fixed when the tumbler rollers 70 are engaged between the cam and the receptacles 74 (i.e., there is virtually no play across the locking junction when the tumbler rollers 70 are advanced outwardly by the cam 54). For precise engagement the shaft member 20 and the sleeve member 40 have complementary conical tapers securing them against displacement in an axial direction.

The complementary tapers are provided on opposite axial sides of the locking junction. The conical outer diameter 82 of the shaft member 20 rests against the conical inside contour of a tapered bushing 80 fitted into the sleeve member 40. On the opposite axial end the sleeve member 40 has a conical inside contour 84 that rests against the conical outside taper of a split tapered bushing 86. The upper bushing or taper ring 82 forms a solid ring and inherently positions the sleeve 40 at fixed axial position relative to the conical flared end 82 of the shaft 20. However, inasmuch as opposite end bushing 86 is split (i.e., is parted at least at one point around its circumference by a gap running parallel to the axis), the bushing 86 can be variably positioned to reside anywhere along a range of axial positions relative to sleeve 40. Split bushing 86 is mounted in this manner to provide a means to adjust for the dimensional tolerances of the sleeve member as needed to obtain the predetermined security of engagement of the shaft 20 and the sleeve 40 without unduly causing frictional engagement of the two members 20, 40. The split bushing 86 and a spacing washer 92 are axially fixed on the shaft member by a C-shaped retaining clip 94, that resides in a groove on the outer surface of shaft 20 (see also FIG. 6). During production and before the retaining clip 94 is attached, the split bushing is raised relative to the shaft member 20 by such amount as needed to obtain a predetermined axial pressure on opposite ends of the sleeve 40. The position of the split bushing 86 is then noted and a spacer washer 92 of the required axial dimension is slid over shaft 20 from the bottom, and locked axially in place via retaining clip 94. Whereas the manufacturing tolerance for sleeve 40 and shaft 20 may be allowed to vary, e.g., by 0.010 inch or more, the precision of the attachment is on the order of 0.001 inch or better, by correcting for such tolerance using the required size of spacing washer 92.

Figure 6:
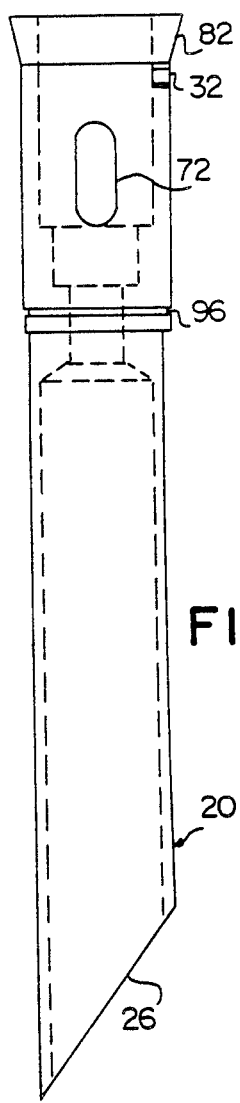
FIG. 6 is an elevation view showing the tube member, attachable between the sleeve member and the bicycle fork.
Figure 5:
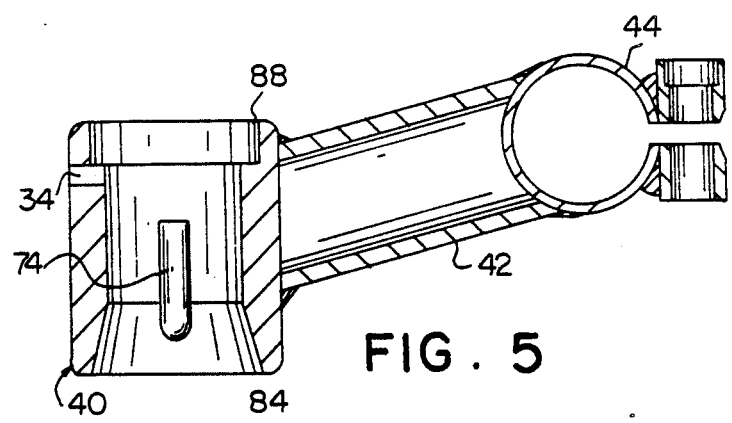
FIG. 5 is a section view showing the sleeve member and handlebar clamp.

A preferred internal configuration of the sleeve member 40 and an external configuration of shaft member 20 are shown in FIGS. 5 and 6, respectively. The sleeve member as shown has receptacles 74 formed on the inner surface and a conical lower contour 84 for interacting with the split bushing 86. The upper conical taper for the sleeve member is formed by a separate taper ring 80 that rests on an internal flange 88 at the axial end of the sleeve member 40. Preferably, the taper ring 80 and split taper bushing 86 are made of brass or bronze for reduced friction. It is also possible to use a hard (non-compressible) plastic compound for these parts. The spacer washer is preferably stainless steel. The shaft member 20 and sleeve member 40 are steel, the latter preferably being nickel or chrome plated.

Figure 1:
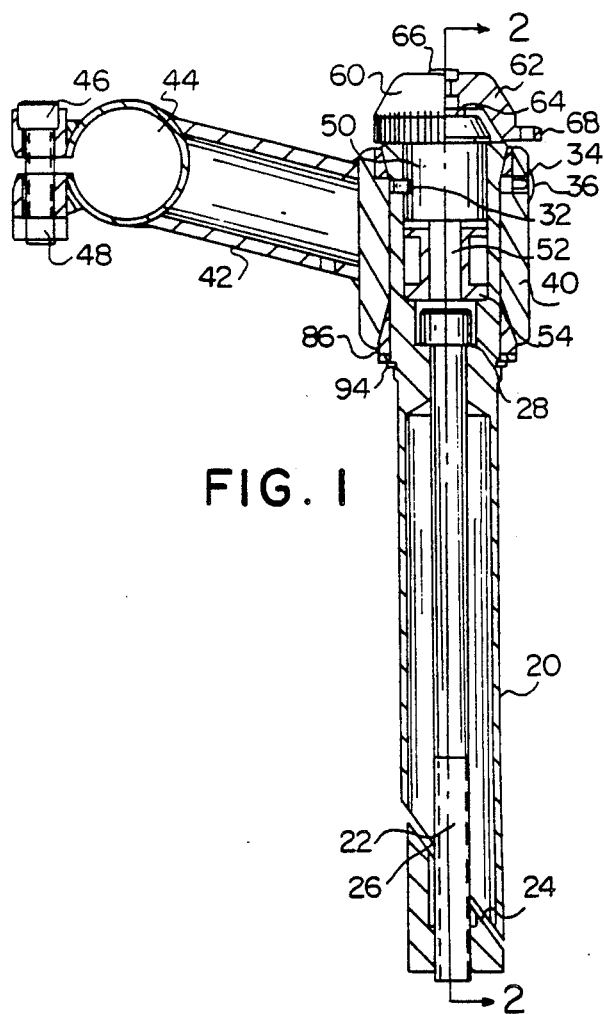
FIG. 1 is a vertical section view through a handlebar clamp and headstem assembly including the locking mechanism of the invention.

As noted above, the shaft 20 is mounted to the tube of the fork 124 by tightening bolt 22, accessible via the bolt head thereof at the top. An allen wrench fitting can be used for this purpose. Bolt 22 of course must be tightened to lock the shaft member to the fork before the locking mechanism is fully assembled, because the lock cylinder, cam and rollers fit above the head of bolt 22. Preferably, the shaft and sleeve attachment is accomplished at the factory, where the required dimension of the spacer washer 92 can be determined, for example, using a predetermined axial pressure on the split taper bushing 86. The cam 54 and rollers 70 are fixed in the shaft member at the factory, with access to the head of bolt 22 being provided through cam 54 before the cylinder lock is installed. The cylinder lock 50 is removable and is installed when the unit is mounted on the fork of the bicycle. As shown in FIG. 1, the housing of the cylinder lock 50 has a receptacle for a set screw 32, passed through a threaded opening in the wall of the shaft member and threaded or butted into a radial opening in the cylinder lock such that the set screw bridges between the cylinder lock and the shaft member. This holds the cylinder lock axially in the shaft member 20 and also prevents relative rotation of the cylinder lock and shaft member. The set screw can be accessed by rotating the sleeve 40 relative to the shaft 20 until the set screw 32 is aligned with access opening 34 in sleeve 40.

Assembly at the factory is accomplished by first placing bolt 22 in shaft 20 from the top and threading the nut 24 onto the bottom of bolt 22. Conical bushing 80 is then fitted into the top of the sleeve member 40. Next, cam 54 is inserted into the shaft 20 and aligned such that the flat surfaces of the cam face the apertures 72. The tumbler rollers 70 are inserted into the cam 54 through apertures 72, whereupon the shaft member is dropped down into the sleeve member. The split conical bushing 86 is slid upwardly into position against sleeve 40. A spacer washer 92 of the required thickness is placed over the shaft 20 from the bottom and the arrangement is fixed by C-shaped retaining ring 94.

During installation on the bicycle, and in particular after the bolt 22 is tightened (by access via allen wrench through the square hole in the cam 54), the rotatable shaft 52 of the cylinder lock 50 can be placed in the square opening therefor in the cam 54 as the cylinder lock is placed in shaft member 20. The sleeve member is rotated to gain access to the opening for the set screw 32 in the cylinder lock housing, via access opening 34. After the set screw is in place, a press-fit cap 36 closes the access opening.

Figure 2:
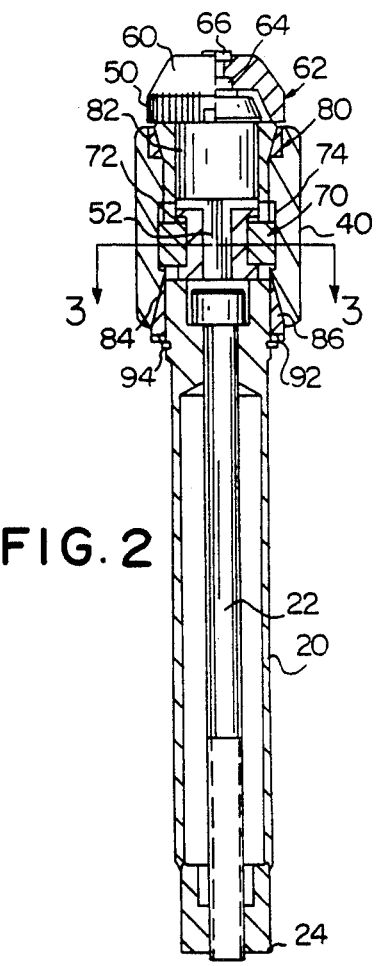
FIG. 2 is a section view through the assembly according to FIG. 1, taken along line 2—2 in FIG. 1.
Figure 12:
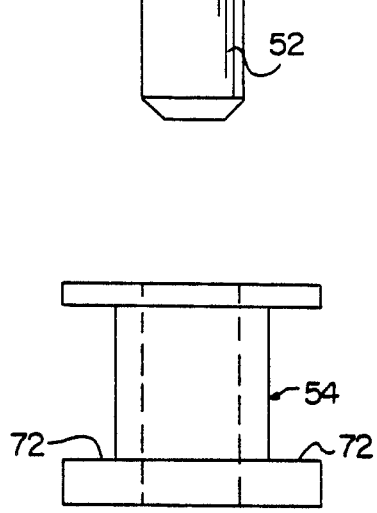
FIG. 12 is an elevation view of the locking cam.
Figure 11:
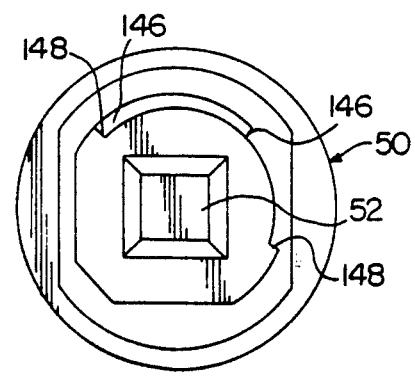
FIG. 11 is a bottom plan view thereof.

The cylinder lock 50 has a coaxial shaft 52, rotatable upon release of the lock, i.e., using the key 60. The shaft has a non-round cross section, e.g., square, and is coupled to the cam such that the cam is rotated using the key. With reference to FIG. 3, the cam 54 is rotatable between the locking position shown, wherein the radially thicker portion of the cam bears against the tumbler rollers 70, and a position displaced 90° therefrom, thus positioning the radially thinner flat sides of the cam 54 toward the tumbler rollers. The cam is barrel shaped as shown in FIGS. 1, 2 and 12, with upper and lower flanges for retaining the tumbler rollers axially.

The cylinder lock 50 and key assembly 60 are shown in FIGS. 7-11. The key 60 preferably has a substantially tubular configuration with an axial end configured uniquely for each lock, having a predetermined arrangement of slots of different depths, for operating lock pins against axial spring pressure. The tubular portion 64 of the key 60 fits into an annular receptacle 130 in the axial end of the cylinder housing and, provided the key fits the lock pins, can be used to rotate a central part 138 of the lock associated with the shaft 52 which engages in the cam 54.

Figure 8:
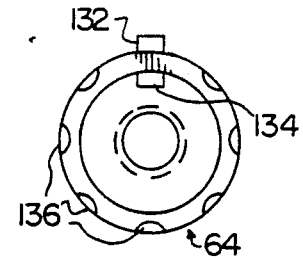
FIG. 8 is a plan view of the key member, corresponding to a view from below in FIG. 7.
Figure 9:
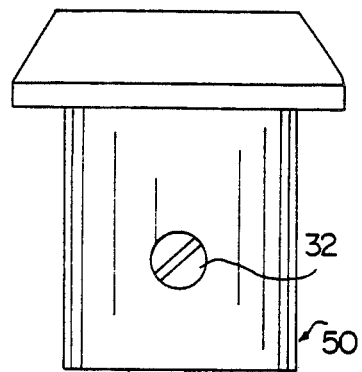
FIG. 9 is an elevation view of the lock cylinder.
Figure 10:
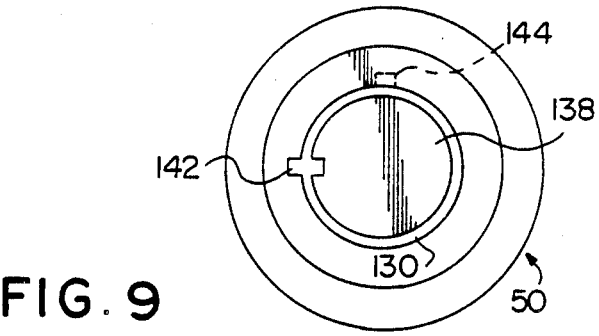
FIG. 10 is a top plan view corresponding to FIG. 9.

The tubular form of key is known in connection with vending machine locks and the like, and according to some embodiments the key cannot be removed unless the key is rotated back to its insertion orientation. According to the invention the tubular part 64 of the key 60 is defined by a short extension under a cap 62, which becomes captive in its locking position on the cylinder lock 50 when the locking mechanism is engaged such that the bicycle is operable, by axial displacement of the captured key when the lock is in the engaged position. The key tube 64 has at least one radially protruding guide tab 132, 134, and is inserted at a predetermined angular insertion orientation defined by the tab into the annular key receptacle 130 in the body of the lock 50. The key receptacle has at least one first longitudinal slot for the guide tab 132, 134, disposed at a first angular orientation of the key 60, and at least one longitudinal fixing slot 144 for the guide tab 132, 134, the fixing slot 144 being aligned with the tab 132, 134 When the key 60 is rotated to urge the tumbler rollers 70 into the receptacles 74 via the cam 54, slot 144 permitting some axial displacement of the captive key. As shown in FIG. 8, the guide tab has a portion 132 protruding radially outwardly into a slot in the cylinder lock casing (which slot defines the insertion position). The guide tab also has a portion 134 protruding radially inwardly into a slot in the center shaft 138 of the cylinder lock, thereby rotationally attaching the key and the center shaft 138. The fixing slot 144 is arranged such that the key cannot be removed from the slot 130 unless the key is first pressed down again and rotated to the position defined for insertion, i.e., with tabs 132, 134 aligned with the entrance slot 142. The key thus remains captured in the lock when the shaft member 20 and sleeve member 40 are engaged.

The lock pins (not shown) which define the unique configuration whereby the lock will open only to its associated key, are arranged to bear axially upwardly against the key via springs. Therefore the user must press the key into the lock such that the tubular portion 64 of the key 60 bottoms out in the key receptacle slot 130. In this position the lock pins extend upwardly to positions defined by the various axial depths of the grooves 136 (see FIG. 8) in the tubular part 64 of the key. The pins are each separated in known manner such that when the grooves 136 are all of the correct axial length, a shear plane is provided whereby the key 60 can be rotated together with center shaft 138 relative to the housing of the lock. The central part 138 of the lock is coupled to rotate shaft 52 and cam 54.

Inasmuch as the pins bear resiliently upwardly and since locking position slot 144 is blocked against extraction of the key, the pins force the key upwardly into a position where the lock cannot be rotated by vibration or the like back toward the release angle. Tab 132 resides in slot 144, Whereby the lock cannot be returned to the release angle until the key is again pushed down. Therefore, the lock remains at the fully engaged position and is safe against inadvertent release or loosening of the engagement. Preferably, the shaft 52 is provided with stop structures 148 that interact with stop structures 146 on the housing of the lock. The stops provide a positive means for positioning the lock and key at the correct angle for insertion and for capture.

Figure 7:
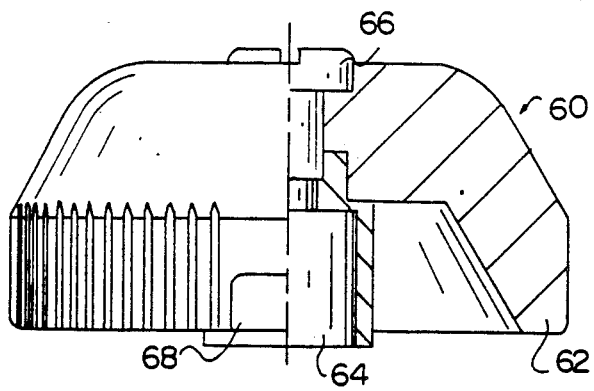
FIG. 7 is an elevation view, partly in section, showing the key assembly.

The key assembly 60 includes a rounded end cap 62 configured to cover a top of the lock. The rounded end cap forms a safe and weather protecting cover for the locking apparatus, and will not injure the rider in the event of a collision. The cover can be made of metal or plastic, and if desired can be soft. The tubular part 64 of the key assembly 60 is attached to the underside of the cover by a central screw 66 or the like, and preferably is arranged to extend no further than the plane of the bottom of the cover, or at most to protrude only minimally as shown in FIG. 7. The cover 62 has a tab 68, which defines a point of reference for the key assembly as well as a means to attach the key assembly to a key chain, etc. Preferably, tab 68 is longitudinally aligned with the frame of the bicycle when the key is aligned with one of the insertion slot 142 and the capture slot 144, providing the user with a means to align the key to the lock visually as well as a means to determine the current status of the lock before attempting to operate the bicycle. The key assembly as a whole is small and is shaped to be carried in the owner's pocket.

The locking mechanism as shown has two diametrically opposite locking bodies in the form of tumbler rollers 70. The rollers 70 have rounded surfaces facing radially outwardly toward respective receptacles therefor and radially inwardly toward the cam, the cam having rounded surfaces bearing radially against the locking bodies. It is also possible to arrange the locking mechanism with the locking bodies formed in other specific shapes, however preferably at least the radially outward facing surfaces are rounded and engage in complementary rounded receptacles 74. For example, the locking bodies can be axially elongated rollers with rounded surfaces facing radially inwardly and outwardly but having flattened sides rather than a fully round cross section. The receptacles 74 in that case are still defined by partially cylindrical slots in the sleeve member (parallel to the axis of the locking apparatus). The apertures 72, however, can then be provided with substantially parallel walls extending longitudinally and parallel to a radius defined by said axis. This arrangement increases the extent of surface contact between the edges of the shaft member defining apertures 72 and the tumbler rollers or like locking bodies, and is less subject to wear at the edges of the apertures 72. However, there may be a tendency of the tumbler rollers to wear at the point of engagement with cam 54 as they are not then free to roll.

The invention as more particularly defined is a mechanism for discouraging theft of a bicycle having a wheel on a fork 124 rotatable about an axis relative to a frame headstock 120 for steering the bicycle, and a handlebar mount 44 for manually positioning the fork 124, the locking mechanism including a first member 20 having means 22, 24, 26 for rigid attachment relative to the fork 124, a second member 40 having means 42 for rigid attachment relative to the handlebar mount 44, the first and second members 20, 40 defining a cylinder 20 and coaxial sleeve 40 and being rotatably coupleable and decoupleable at a locking junction. One of the first and second members 20, 40 has at least one aperture 72 carrying a locking body 70 and the other of the first and second members 20, 40 has a receptacle 74 for receiving the locking body 70, the receptacle 74 having a radially sloping edge contour, the aperture 72 and the receptacle 74 being correspondingly positioned and dimensioned such that the locking body 70 resides within said aperture 72 when the aperture and receptacle are misaligned, and the locking body 70 can be displaced partway into the receptacle 74 to reside partly in the aperture 72 and partly in the receptacle 74 when the aperture and the receptacle are aligned. A lock 50 is disposed at the locking junction of the first and second members 20, 40, the lock having a cam 54 movable between a first position 144 wherein the cam 54 urges the locking body 70 from the aperture 72 toward the receptacle 74, for fixing the first and second members 20, 40 against relative rotation, such that the bicycle can be operated, and a second position 142 wherein the locking body 70 is free to become retracted into the aperture 72 by action of the sloping edge contour of the receptacle 74, such that the bicycle cannot be operated. The lock 50 includes a cylinder having a shaft 52 rotatable upon release of the lock, the shaft 52 being coupled to the cam 54. The lock 50 is operable via a key 60 having a substantially tubular configuration 64 with a uniquely configured axial end 136, 136 for operating lock pins against axial spring pressure, the key 60 having at least one radially protruding guide tab 132, 134, and being fittable into an annular key receptacle 130 in a body of the lock 50, the key receptacle 130 having at least one first longitudinal slot 142 for the guide tab, and at least one longitudinal fixing slot 144 for the guide tab, the fixing slot 144 being aligned with the tab 132, 134 when the key 60 is rotated to urge the locking body 70 into the receptacle via said cam, the fixing slot 144 being blocked axially against extraction of the key 60, whereby the key remains captured in the lock when the first and second members are fixed against relative rotation.

The cylinder lock 50 is fixed within the first member 20 by a set screw 32, the set screw being accessible through a hole 34 in the second member 40, and further comprising a press fit closure 36 for said hole. The key 60 includes a rounded end cap 62 configured to cover a top of the frame headstock 120. At least one radial abutment 146, 148 in the lock limits rotation of the cam 54 between locking and unlocking positions thereof. Preferably, two diametrically opposite locking bodies 70 are included, and the locking bodies have rounded surfaces facing radially outwardly toward respective receptacles 74 therefor and radially inwardly toward the cam 54. The rotational span of the lock between the locked and unlocked positions is therefore 90°. The cam has rounded surfaces bearing radially against the locking bodies. Alternatively, the locking bodies 70 can be axially elongated rollers having substantially flattened sides, the receptacles 74 being defined by partially cylindrical slots in said second member 40 and the apertures 72 having substantially parallel walls extending longitudinally and parallel to a radius defined by said axis.

The invention provides a safe and secure means for discouraging theft of bicycles, particularly impulse bicycle thefts where the thief comes upon an unattended bicycle and simply and quickly rides it away. While it is possible to disassemble the locking means according to the invention by removing cover 36, extracting set screw 32 and lifting out the cylinder lock, locking rollers and cam, this action is relatively time consuming and does not render the device inoperative because in the disassembled state the shaft member 20 and sleeve member 40 remain relatively rotatable. The thief could go further and loosen the expandable fitting that attaches the shaft member 20 to the fork, but again, such action does not render the bicycle operable.

The invention is such that whenever using the bicycle, the rider needs the key. The key cannot be forgotten when embarking on a trip, and is substantially less likely to be lost or misplaced than that of a lock which disables the bicycle by blocking relatively movable parts of the running or steering gear due to the fact that the user requires the key in normal operation. Moreover, during normal operation the key is captive in the locking apparatus.

The invention having been disclosed and exemplary embodiments explained in detail, variations on the inventive concept will now become apparent to persons skilled in the art. Reference should be made to the appended claims rather than the foregoing specification in order to assess the scope of the invention in which exclusive rights are claimed.

We claim:

1. A mechanism for discouraging theft of a bicycle having a wheel on a fork rotatable about an axis relative to a frame headstock for steering the bicycle, and a handlebar mount for manually positioning the fork, the mechanism comprising:
   a first member having means for rigid attachment relative to the fork;
   a second member having means for rigid attachment relative to the handlebar mount, the first and second members being rotatably coupleable and decoupleable at a locking junction, one of the first and second members having at least one aperture carrying a locking body and the other of the first and second members having a receptacle for receiving the locking body, the receptacle having a radially sloping edge contour, the aperture and the receptacle being correspondingly positioned and dimensioned such that the locking body resides within said aperture when the aperture and the receptacle are misaligned, and the locking body can be displaced partway into the receptacle to reside partly in the aperture and partly in the receptacle when the aperture and the receptacle are aligned;
   a lock disposed at the locking junction of the first and second members, the lock having a cam movable between a first position wherein the cam urges the locking body from the aperture toward the receptacle, for fixing the first and second members against relative rotation, such that the bicycle can be operated, and a second position wherein the locking body is free to become retracted into the aperture by action of the sloping edge contour of the receptacle, such that the bicycle cannot be operated;
   wherein the first and second members define a concentrically arranged tube and cylinder, the tube and the cylinder having complementary conical tapers for securing the first and second members in an axial direction; and,
   means for fixing the first and second members at predetermined relative positions wherein the complementary conical tapers are urged together such that the first and second members are secured against relative axial displacement at a predetermined axial pressure.

2. A mechanism for discouraging theft of a bicycle having a wheel on a fork rotatable about an axis relative to a frame headstock for steering the bicycle, and a handlebar mount for manually positioning the fork, the mechanism comprising:
   a first member having means for rigid attachment relative to the fork;
   a second member having means for rigid attachment relative to the handlebar mount, the first and second members being rotatably coupleable and decoupleable at a locking junction, one of the first and second members having at least one aperture carrying a locking body and the other of the first and second members having a receptacle for receiving the locking body, the receptacle having a radially sloping edge contour, the aperture and the receptacle being correspondingly positioned and dimensioned such that the locking body resides within said aperture when the aperture and the receptacle are misaligned, and the locking body can be displaced partway into the receptacle to reside partly in the aperture and partly in the receptacle when the aperture and the receptacle are aligned;

a lock disposed at the locking junction of the first and second members, the lock having a cam movable between a first position wherein the cam urges the locking body from the aperture toward the receptacle, for fixing the first and second members against relative rotation, such that the bicycle can be operated, and a second position wherein the locking body is free to become retracted into the aperture by action of the sloping edge contour of the receptacle, such that the bicycle cannot be operated;

wherein the first and second members define a concentrically arranged tube and cylinder, the tube and the cylinder having complementary conical tapers for securing the first and second members in an axial direction; and, means for fixing the first and second members against relative axial displacement, said means for fixing the first and second members exerting a predetermined axial pressure and includes a split conical bushing having a tapered surface engageable with a further conical taper on one of said first and second members, the split conical bushing being supported axially by an abutment on the other of the first and second members.

3. The mechanism according to claim 2, wherein the abutment is defined by a C-shaped retaining ring and further comprising a spacer washer disposed between the retaining ring and the split conical bushing.

4. The mechanism according to claim 3, wherein the first member includes a locking post having an expansion mechanism to be received in a tube of the fork and expanded by rotation of an axial bolt having a head accessible below the lock, the second member including a sleeve having oppositely tapered surfaces for receiving the complementary taper of the first member and the split conical bushing, respectively.

5. The mechanism according to claim 4, wherein the lock includes a cylinder having a shaft rotatable upon release of the lock, the shaft being coupled to the cam, and wherein the cylinder is fixed within the second member by a set screw, the set screw being accessible through a hole in the second member, and further comprising a press fit closure for said hole.

6. The mechanism according to claim 4, wherein the lock is operable via a key having a substantially tubular configuration with a uniquely configured axial end for operating lock pins against axial spring pressure, the key having at least one radially protruding guide tab, and being fittable into an annular key receptacle in a body of the lock, the key receptacle having at least one first longitudinal slot for the guide tab, and at least one longitudinal fixing slot for the guide tab, the fixing slot being aligned with the tab when the key is rotated to urge the locking body into the receptacle via said cam, the fixing slot being blocked axially against extraction of the key, whereby the key remains captured in the lock when the first and second members are fixed against relative rotation.

7. The mechanism according to claim 6, wherein the key includes a rounded end cap configured to cover a top of the frame headstock.

8. The mechanism according to claim 6, further comprising at least one radial abutment in the lock for limiting rotation of the cam between locking and unlocking positions thereof.

9. The mechanism according to claim 2, comprising two diametrically opposite locking bodies, and wherein the locking bodies have rounded surfaces facing radially outwardly toward respective receptacles therefor and radially inwardly toward the cam, the cam having rounded surfaces bearing radially against the locking bodies.

10. The mechanism according to claim 9, wherein the locking bodies are axially elongated and have substantially flattened sides, the receptacles being defined by partially cylindrical slots in said second member and the apertures having substantially parallel walls extending longitudinally and parallel to a radius defined by said axis.

11. A mechanism for discouraging theft of a bicycle having a wheel on a fork rotatable about an axis relative to a frame headstock for steering the bicycle, and a handlebar mount for manually positioning the fork, the mechanism comprising:

a first member having means for rigid attachment relative to the fork;

a second member having means for rigid attachment relative to the handlebar mount, the first and second members defining a cylinder and coaxial sleeve and being rotatably coupleable and decoupleable at a locking junction, one of the first and second members having at least one aperture carrying a locking body and the other of the first and second members having a receptacle for receiving the locking body, the receptacle having a radially sloping edge contour, the aperture and the receptacle being correspondingly positioned and dimensioned such that the locking body resides within said aperture when the aperture and receptacle are misaligned, and the locking body can be displaced partway into the receptacle to reside partly in the aperture and partly in the receptacle when the aperture and the receptacle are aligned;

a lock disposed at the locking junction of the first and second members, the lock having a cam movable between a first position wherein the cam urges the locking body from the aperture toward the receptacle, for fixing the first and second members against relative rotation, such that the bicycle can be operated, and a second position wherein the locking body is free to become retracted into the aperture by action of the sloping edge contour of the receptacle, such that the bicycle cannot be operated, said lock including a cylinder having a shaft rotatable upon release of the lock, the shaft being coupled to the cam, and wherein the lock is operable via a key having a substantially tubular configuration with a uniquely configured axial end for operating lock pins against axial spring pressure, the key having at least one radially protruding guide tab, and being fittable into an annular key receptacle in a body of the lock, the key receptacle having at least one first longitudinal slot for the guide tab, and at least one longitudinal fixing slot for the guide tab, the fixing slot being aligned with the tab when the key is rotated to urge the locking body into the receptacle via said cam, the fixing slot being blocked axially against extraction of the key, whereby the key remains captured in the lock when the first and second members are fixed against relative rotation.

12. The mechanism according to claim 11, wherein the cylinder is fixed within the second member by a set screw, the set screw being accessible through a hole in the second member, and further comprising a press fit closure for said hole.

13. The mechanism according to claim 11, wherein the key includes a rounded end cap configured to cover a top of the frame headstock.

14. The mechanism according to claim 11, further comprising at least one radial abutment in the lock for limiting rotation of the cam between locking and unlocking positions thereof.

15. The mechanism according to claim 11, comprising two diametrically opposite locking bodies, and wherein the locking bodies have rounded surfaces facing radially outwardly toward respective receptacles therefor and radially inwardly toward the cam, the cam having rounded surfaces bearing radially against the locking bodies.

16. The mechanism according to claim 15, wherein the locking bodies are axially elongated and have substantially flattened sides, the receptacles being defined by partially cylindrical slots in said second member and the apertures having substantially parallel walls extending longitudinally and parallel to a radius defined by said axis.

* * * * *